(No Model.)
A. ATWOOD & I. S. McGIEHAN.
RAILWAY WHEEL.
No. 250,414. Patented Dec. 6, 1881.
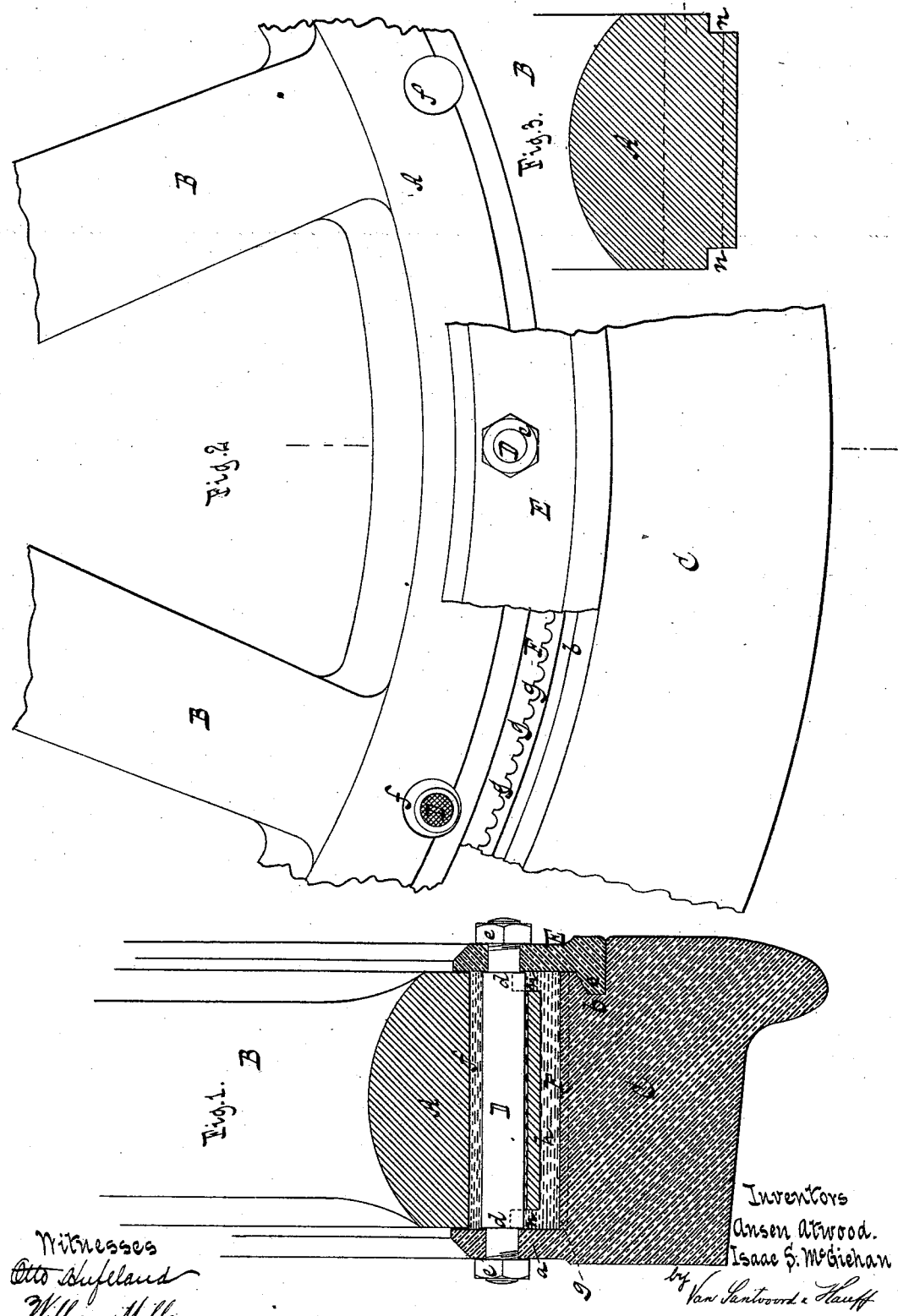
Witnesses
Otto Hufeland
William Miller
Inventors
Ansen Atwood.
Isaac S. McGiehan
by Van Santvoord & Hauff
their attys

UNITED STATES PATENT OFFICE.

ANSEN ATWOOD, OF DUNELLEN, AND ISAAC S. McGIEHAN, OF JERSEY CITY, NEW JERSEY, ASSIGNORS TO THE ATWOOD RAILWAY WHEEL COMPANY, OF NEW YORK, N. Y.

RAILWAY-WHEEL.

SPECIFICATION forming part of Letters Patent No. 250,414, dated December 6, 1881.

Application filed March 14, 1881. (No model.)

*To all whom it may concern:*

Be it known that we, ANSEN ATWOOD, a citizen of the United States, residing at Dunellen, in the county of Middlesex and State of New Jersey, and ISAAC S. McGIEHAN, a citizen of the United States, residing at Jersey City, in the county of Hudson and State of New Jersey, have invented new and useful Improvements in Railway-Wheels, of which the following is a specification.

This invention relates to an improvement on that class of railway-wheels which is constructed with a tire separate from the body and with a cushion of felt, leather, or hemp interposed between the tire and the body, such as described in Letters Patent No. 175,321, granted to Ansen Atwood, March 28, 1876.

The principal feature of our invention relates to the means employed for securing the tire to the body of the wheel, and to the corrugations which run transversely to the tread of the wheel, as will be hereinafter more fully explained.

Our invention is illustrated in the accompanying drawings, in which Figure 1 represents a transverse section. Fig. 2 is a face view, partly in section. Fig. 3 is a transverse section of the rim of the wheel.

Similar letters indicate corresponding parts.

In these drawings, the letter A designates the rim of our wheel, which connects by the spokes or plate B with the hub.

C is the tire, which is made separate from the rim A, and provided with a flange, $a$, on one side and with a circular groove, $b$, on its opposite side. The flange has a series of holes for the passage of the bolts D. The circular groove $b$ engages with a lip, $c$, projecting from the inner surface of a ring, E, which is also provided with holes for the passage of the bolts D. These bolts are made with two shoulders, $d\ d$, the distance between which is a trifle larger than the width of the rim A, so that when the nuts $e\ e$ at the ends of said bolts are drawn up tight against the flange $a$ on one side and against the hooked ring E on the opposite side, as shown in Fig. 1, said flange and ring are not caused to hug the rim tightly, but leave the tire free to cushion on the packing, hereinafter mentioned.

In the rim are a series of holes, $f$, which are considerably larger than the bodies of the bolts D, (see Fig. 2 and Fig. 3 in dotted lines,) so that these bolts are free to move therein. The vacant spaces of the holes $f$ round the bolts D are filled with lead, leather, felt, india-rubber, or any other suitable material to form a cushion which prevents the bolts from striking against the rim A.

Between the inner circumference of the tire C and the outer circumference of the rim A is left an annular space, F, which communicates with the holes $f$, and is also filled with lead, leather, felt, india-rubber, or other suitable material to form a cushion, $h$, between the tire and the rim and between the edges of recesses $n\ n$ of the rim and the flange $a$ and ring E, which latter portion of the cushion is intended to receive and absorb the lateral motions of the tire; and in order to prevent the tire from slipping round on the rim its inner surface is provided with corrugations $g$, Fig. 2, running transversely to the tread of the wheel. These corrugations are intended to bite into or engage with the cushion $h$, and by reason of their transverse direction they effectually prevent the tire from slipping round on the rim.

The material which we prefer for the cushion $h$, particularly if our invention is applied to locomotive driving-wheels, is a fusible metal, such as lead or a composition of lead with other metals, since such metal, while in a molten state, can be poured into the space F between the tire and the rim without removing the wheel from the axle, and the operation of re-tiring a wheel is greatly facilitated.

We are well aware that lead has been used to weld the tire to the rim, so that both shall form one solid piece; but our purpose in introducing lead into the annular chamber F is not to secure the tire to the rim, for that object is adequately accomplished by means of the bolt D, but merely to have the lead act as a cushion between the tire C and the rim A. This cushion of lead, when introduced into the cavities $n\ n$, prevents the ring E on one side and the flange a on the other side from impinging on the rim or wheel center, as well as neutralizes all motion that may be conveyed through the tire C.

By these means a railway-wheel is obtained which, when applied to cars or locomotives, materially reduces the noise, rendering the same of particular advantage for elevated railroads. Furthermore, the tire is not liable to become loose when heated by the application of the brakes, since it is always held firmly in position by the bolts D. It is not liable to crack or to cause the center to burst in cold weather, and the tire of one of our wheels will wear considerably longer than that of an ordinary railway or driving wheel. It also reduces the wear on rails, rail-joints, frogs, &c., and if the tire should break in numerous places it cannot become detached from the wheel, so that accidents now arising from broken tires are avoided. New tires can be put on our wheels without removing them from the axles, and we consider our wheel the safest and cheapest in existence and the only one adapted to high speed.

We are aware that various attempts have been made to construct car-wheels having leather, rubber, felt, cotton, and wool placed between the tire and the body of the wheel to form a cushion. This kind of packing, as well as the tire on the wheel, has been held to its place on the central portion of the wheel by a binding-ring and bolts or rivets. We do not therefore claim such as our invention.

We are also aware that a steel or iron tire for railway-wheels which has its inner surface corrugated and presenting a waved line in cross-section is not new, such being shown in the Patent No. 175,321.

What we claim as new, and desire to secure by Letters Patent, is—

1. The combination, substantially as hereinbefore set forth, of the tire, the flange on one side extending in toward the center, the annular space F between the tire and the rim, the hooked ring constructed to engage with the tire and the bolts passing through holes $f$ in the rim, and having a shoulder on each end to prevent the flange of the tire and the hooked ring from bearing against the sides of the rim, and a suitable packing to fill the annular space between the tire and the rim and the holes $f$.

2. The combination, substantially as hereinbefore described, of the tire having corrugations running transversely to its tread, the rim, the annular space between the tire and the rim, the cushion in said space, the flange $a$, and the hooked ring E, which engages with the tire and the bolts extending through the rim, the flange, and the hooked ring.

3. A railway-car wheel embodying in its structure the following characteristics, namely: a rim formed with the annular side recesses, $n$ $n$, and transverse passages or holes $f$, the tire C, formed on its inner surface with the transverse corrugations $g$, and a packing of fusible metal interlocking the annular recesses $n$ and the transverse passages $f$ of the rim with the transverse corrugations of the tire, substantially as described, for the purposes set forth.

In testimony whereof we have hereunto set our hands and seals in the presence of two subscribing witnesses.

ANSEN ATWOOD. [L. S.]
  ISAAC S. McGIEHAN. [L. S.]
Witnesses:
 W. HAUFF,
 E. F. KASTENHUBER.